(12) United States Patent
Osgood et al.

(10) Patent No.: US 11,359,494 B2
(45) Date of Patent: Jun. 14, 2022

(54) ENGINE COMPONENT WITH COOLING HOLE

(71) Applicant: GENERAL ELECTRIC COMPANY, Schenectady, NY (US)

(72) Inventors: Daniel Endecott Osgood, Cincinnati, OH (US); Kirk Douglas Gallier, Cincinnati, OH (US); Daniel Lee Durstock, Fort Wright, KY (US); Zachary Daniel Webster, Mason, OH (US); Gregory Terrence Garay, West Chester, OH (US)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 16/532,787

(22) Filed: Aug. 6, 2019

(65) Prior Publication Data
US 2021/0040859 A1 Feb. 11, 2021

(51) Int. Cl.
*F01D 5/18* (2006.01)

(52) U.S. Cl.
CPC .......... *F01D 5/185* (2013.01); *F05D 2220/32* (2013.01)

(58) Field of Classification Search
CPC ....... F01D 5/185; F01D 5/186; F05D 2220/32
See application file for complete search history.

(56) References Cited

U.S. PATENT DOCUMENTS

| | | | | |
|---|---|---|---|---|
| 4,992,025 A * | 2/1991 | Stroud | .................... | F01D 5/186 416/97 R |
| 5,779,437 A * | 7/1998 | Abdel-Messeh | ........ | F01D 5/186 415/115 |
| 6,145,319 A * | 11/2000 | Burns | ..................... | F23R 3/002 60/754 |
| 6,164,912 A * | 12/2000 | Tabbita | ................... | F01D 5/187 416/97 R |
| 6,183,199 B1 * | 2/2001 | Beeck | ..................... | F01D 5/186 416/97 R |
| 6,241,468 B1 | 6/2001 | Lock et al. | | |
| 7,246,992 B2 * | 7/2007 | Lee | .......................... | B23H 9/10 415/115 |
| 7,597,540 B1 * | 10/2009 | Liang | ..................... | F01D 5/186 416/97 R |
| 7,922,451 B1 * | 4/2011 | Liang | ....................... | F01D 5/20 416/97 R |
| 8,057,181 B1 * | 11/2011 | Liang | ..................... | F01D 5/186 416/97 R |

(Continued)

*Primary Examiner* — J. Todd Newton, Esq.
*Assistant Examiner* — Theodore C Ribadeneyra
(74) *Attorney, Agent, or Firm* — McGarry Bair PC

(57) ABSTRACT

An apparatus and method for an engine component for a turbine engine comprising an outer wall having an outer surface and bounding an interior, the outer wall defining a pressure side and a suction side, extending axially between a leading edge and a trailing edge to define a chord-wise direction, and extending radially between a root and a tip to define a span-wise direction, at least one cooling supply conduit provided in the interior, and at least one cooling passage fluidly coupling the at least one cooling supply conduit to the outer surface of the outer wall, the at least one cooling passage comprising an outlet opening onto the outer surface along the leading edge, an inlet fluidly coupled to the at least one cooling supply conduit, and a curved passage defining a curvilinear centerline.

32 Claims, 16 Drawing Sheets

(56) References Cited

U.S. PATENT DOCUMENTS

| | | | | |
|---|---|---|---|---|
| 8,245,519 B1* | 8/2012 | Liang | | F01D 5/186 60/806 |
| 8,672,613 B2* | 3/2014 | Bunker | | F01D 5/186 415/115 |
| 8,851,848 B1 | 10/2014 | Liang | | |
| 8,858,176 B1* | 10/2014 | Liang | | F01D 5/186 416/97 R |
| 9,279,330 B2 | 3/2016 | Xu et al. | | |
| 9,777,577 B2* | 10/2017 | Brandl | | F01D 25/12 |
| 10,006,371 B2* | 6/2018 | McBrien | | F01D 5/186 |
| 10,247,011 B2* | 4/2019 | Quach | | F23R 3/002 |
| 10,443,395 B2* | 10/2019 | Webster | | F01D 9/02 |
| 10,570,747 B2* | 2/2020 | Rudolph | | F01D 5/288 |
| 10,605,092 B2* | 3/2020 | Xu | | F04D 29/324 |
| 10,830,052 B2* | 11/2020 | Howe | | F02K 3/06 |
| 10,830,053 B2* | 11/2020 | Garay | | F01D 5/186 |
| 10,927,682 B2* | 2/2021 | Smith | | F01D 5/187 |
| 2006/0073016 A1* | 4/2006 | Liang | | F01D 5/186 416/97 R |
| 2006/0171807 A1* | 8/2006 | Lee | | B23H 9/10 416/97 R |
| 2009/0074575 A1* | 3/2009 | Propheter-Hinckley | | F01D 5/186 416/95 |
| 2010/0040478 A1* | 2/2010 | Abdel-Messeh | | F01D 5/186 416/97 R |
| 2010/0068033 A1* | 3/2010 | Liang | | F01D 5/186 415/115 |
| 2014/0037429 A1* | 2/2014 | Okita | | F01D 5/186 415/115 |
| 2014/0154096 A1* | 6/2014 | Kollati | | F01D 5/186 416/97 R |
| 2016/0047250 A1* | 2/2016 | Lewis | | F01D 9/041 415/115 |
| 2016/0177734 A1* | 6/2016 | Quach | | F01D 5/141 416/1 |
| 2016/0326886 A1* | 11/2016 | Lewis | | F01D 5/186 |

* cited by examiner

ENGINE COMPONENT WITH COOLING HOLE

TECHNICAL FIELD

This disclosure generally relates to cooling holes in engine components, and more particularly to cooling holes along a leading edge of a component.

BACKGROUND

Turbine engines, and particularly gas or combustion turbine engines, are rotary engines that extract energy from a flow of combusted gases passing through the engine onto a multitude of rotating turbine blades, which can be arranged in multiple turbine blade assemblies.

In one configuration, turbine blade assemblies include the turbine airfoil, such as a stationary vane or rotating blade, with the blade having a platform and a dovetail mounting portion. The turbine blade assembly includes cooling inlet passages as part of serpentine circuits in the platform and blade used to cool the platform and blade. Nozzles comprising stationary vanes located between inner and outer bands and combustor liners surrounding the combustor of the engine can also utilize cooling holes and/or serpentine circuits.

The serpentine circuits can extend to cooling holes located along any of the multiple surfaces of the blade including at the tip, trailing edge, and leading edge. The direction and implementation of a cooling airflow at the leading edge affects the durability of the turbine airfoil.

BRIEF DESCRIPTION

In one aspect, the present disclosure relates to an airfoil for a turbine engine, the airfoil comprising: an outer wall having an outer surface and bounding an interior, the outer wall defining a pressure side and a suction side, extending axially between a leading edge and a trailing edge to define a chord-wise direction, extending radially between a root and a tip to define a span-wise direction, and defining a stagnation line extending in the span-wise direction separating the pressure side from the suction side proximate the leading edge; at least one cooling supply conduit provided in the interior; and at least one cooling passage fluidly coupling the at least one cooling supply conduit to the outer surface of the outer wall, the at least one cooling passage comprising: an outlet opening onto the outer surface proximate the leading edge and having a first width and a first height defining a first cross-sectional area with a first aspect ratio greater than or equal to 1:1, an inlet fluidly coupled to the at least one cooling supply conduit and having a second width and a second height defining a second cross-sectional area, and a curved passage defining a curvilinear centerline extending between a geometric center of both the outlet and the inlet where the curvilinear centerline is perpendicular to the first and second cross-sectional areas.

In another aspect, the present disclosure relates to a component for an engine with rotating parts about an engine centerline, the component having an interior bounded by an outer wall having an outer surface with a stagnation line defined by where a flow of combusted gases in contact with the outer surface has a velocity of zero, having at least one cooling supply conduit located within the interior, and having at least one cooling passage, the at least one cooling passage comprising: an outlet opening onto the outer surface proximate the stagnation line, the outlet having a first width and a first height defining a first cross-sectional area with a first aspect ratio greater than or equal to 1:1, an inlet fluidly coupled to the at least one cooling supply conduit and having a second width and a second height defining a second cross-sectional area, and a curved passage defining a curvilinear centerline extending between a geometric center of both the outlet and the inlet where the curvilinear centerline is perpendicular to the first and second cross-sectional areas; wherein the curved passage defines a turn between an axial direction and a radial direction with respect to the engine centerline.

In yet another aspect, the present disclosure relates to a method of cooling an engine component having an outer wall bounding an interior the method comprising: flowing a cooling fluid flow from the interior in a first direction through a curved passage of a cooling hole from an inlet to an outlet to define a flow direction; converging the cooling fluid flow in a first direction and simultaneously diverging the cooling fluid flow in a second direction perpendicular to the first direction where both the first and second directions lie in a plane perpendicular to the flow direction; and exhausting the cooling fluid flow at a location proximate a stagnation line of the engine component.

DETAILED DESCRIPTION

Figure 1:
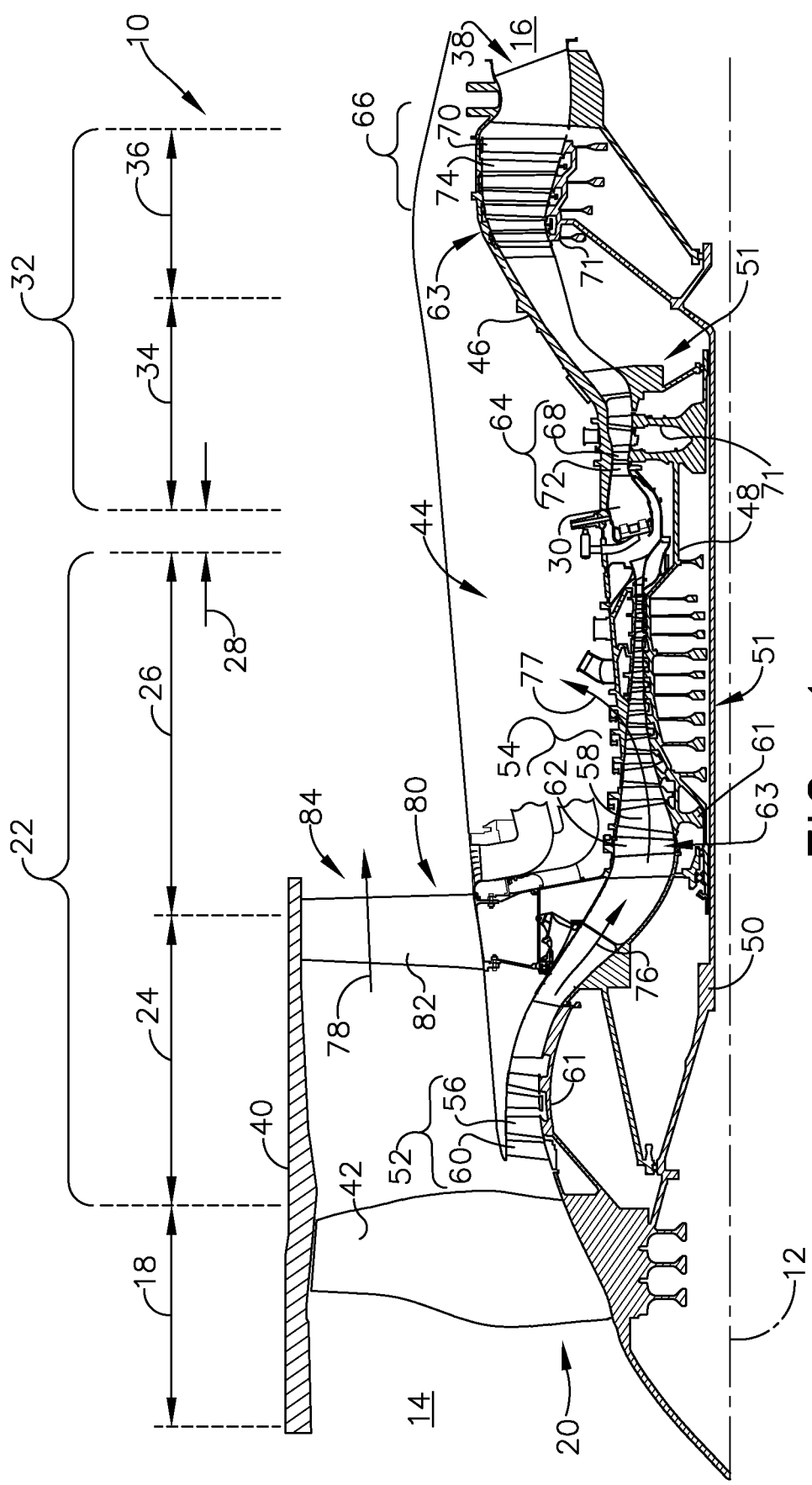
FIG. 1 is a schematic cross-sectional diagram of a turbine engine for an aircraft.

Aspects of the disclosure described herein are directed to at least one cooling passage having an inlet fluidly coupled to at least one cooling supply and an outlet located along a leading edge of an engine component. More specifically, at least a portion of the outlet is aligned with a stagnation line. For purposes of illustration, the present disclosure will be described with respect to a turbine blade in the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
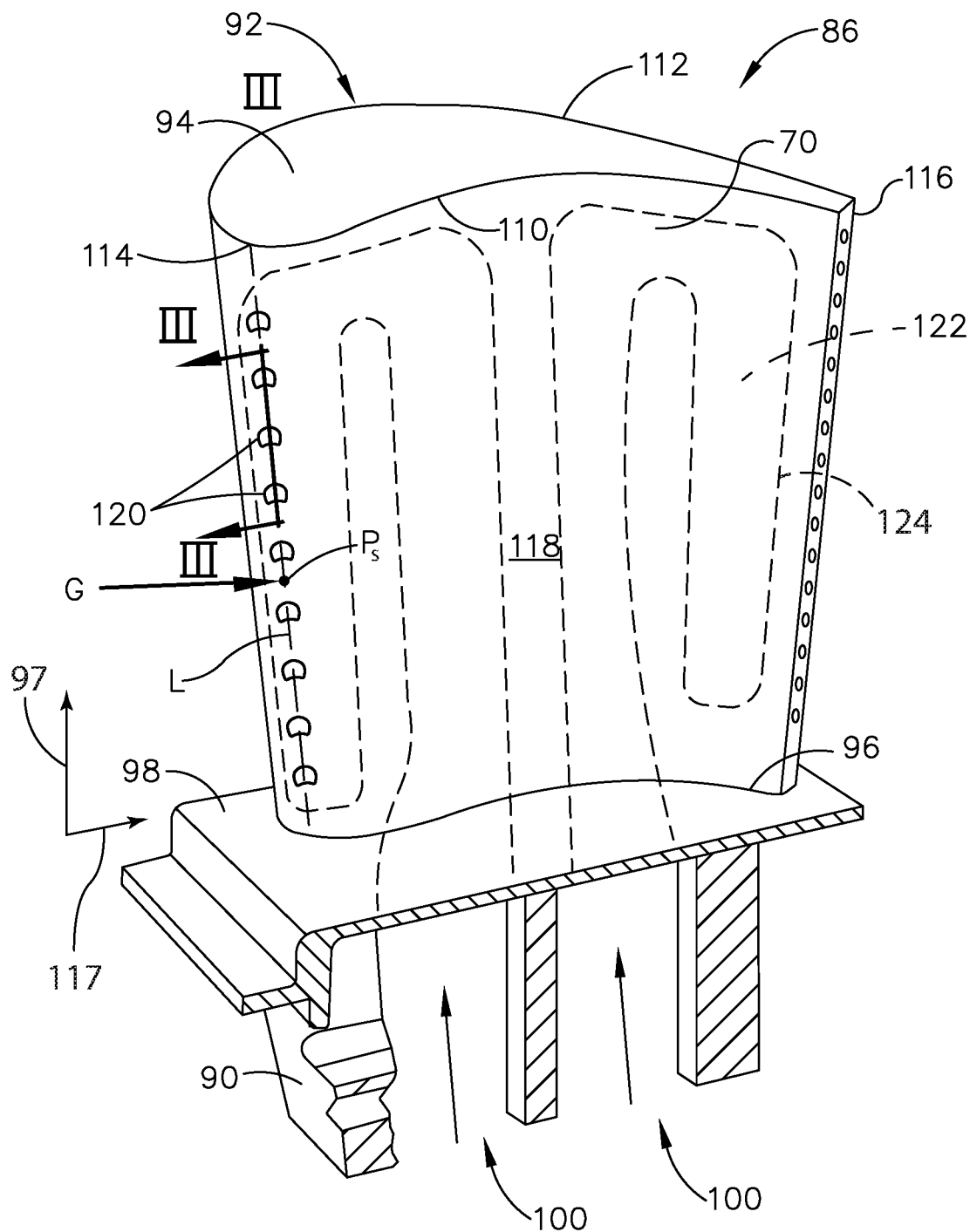
FIG. 2 is a perspective view of a turbine blade for the turbine engine from FIG. 1 including at least one cooling hole located along a leading edge of the turbine blade.

FIG. 2 is a perspective view of an engine component in the form of a turbine blade assembly 86 with a turbine blade 70 of the engine 10 from FIG. 1. Alternatively, the engine component can be a vane, a strut, a service tube, a shroud, or a combustion liner in non-limiting examples, or any other engine component that can require or utilize cooling passages.

The turbine blade assembly 86 includes a dovetail 90 and an airfoil 92. The airfoil 92 extends between a tip 94 and a root 96 to define a span-wise direction 97. The airfoil 92 mounts to the dovetail 90 on a platform 98 at the root 96. When multiple airfoils are circumferentially arranged in side-by-side relationship, the platform 98 helps to radially contain the turbine engine mainstream air flow. The dovetail 90 can be configured to mount to the turbine rotor disk 71 on the engine 10. The dovetail 90 further includes at least one inlet passage 100, exemplarily shown as two inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure side 110 and a convex-shaped suction side 112 which are joined together to define an airfoil cross-sectional shape of the airfoil 92 extending between a leading edge 114 and a trailing edge 116 to define a chord-wise direction 117. An outer periphery of the airfoil 92 is bound by an outer wall 118, which also defines the pressure and suction sides 110, 112. An interior 122 of the airfoil 92 can include at least one cooling supply conduit, illustrated in dashed line as multiple cooling supply conduits 124. The multiple cooling supply conduits 124 can be fluidly coupled with at least one of the inlet passages 100. At least one cooling hole 120 can be located along any portion of the outer wall 118 including along the leading edge 114 as illustrated.

The at least one cooling hole 120 can pass through a substrate, which by way of illustration is outer wall 118. It should be understood, however, that the substrate can be any wall within the engine 10 including but not limited to interior walls, a tip wall, or a combustion liner wall. Materials used to form the substrate include, but are not limited to, steel, refractory metals such as titanium, or superalloys based on nickel, cobalt, or iron, and ceramic matrix composites. The superalloys can include those in equiaxed, directionally solidified, and crystal structures. The substrate can be formed by a variety of methods, including additive manufacturing, casting, electroforming, or direct metal laser melting, in non-limiting examples. The airfoil 92 can be an additively manufactured component. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

In operation when a flow of combusted gases (G) contacts the airfoil 92 at an angle of ninety degrees, the velocity of the combusted gases (G) is zero at this point, a stagnation point (P). The stagnation point (P) can vary a certain degree along the leading edge 114 extending from the root 96 to the tip 94. It is contemplated that the at least one cooling hole 120 is located along a stagnation line (L) extending from the root 96 to the tip 94 connecting stagnation points (P). In most cases the stagnation line (L) is co-linear with leading edge. However, the stagnation line (L) can temporarily or permanently vary from all or part of the leading edge 114 during all or part of the operational conditions.

Figure 3:
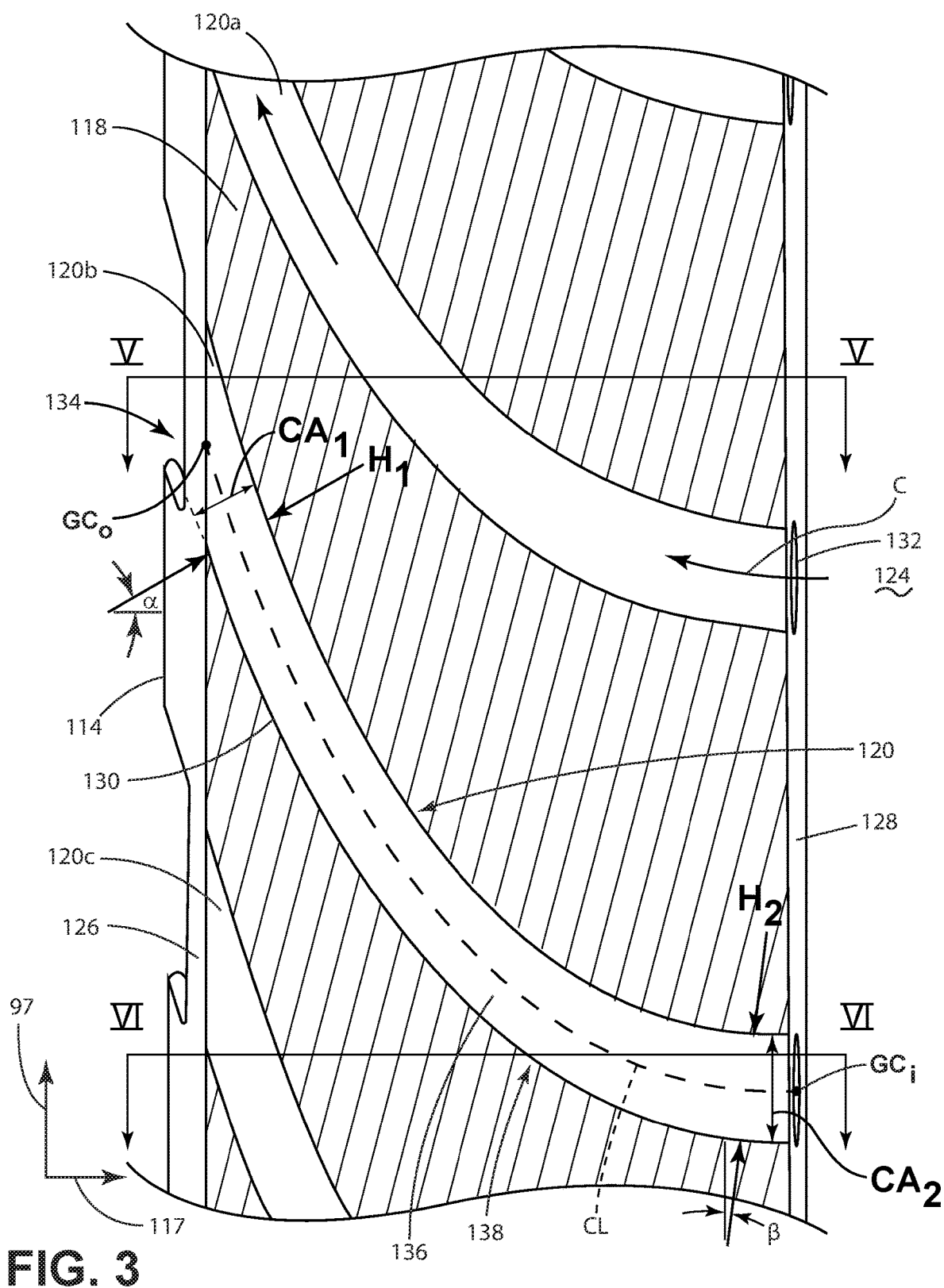
FIG. 3 is a cross-section of a portion of the turbine blade at the leading edge from FIG. 2 taken along line illustrating a cooling passage for the at least one cooling hole according to an aspect of the disclosure herein.

FIG. 3 is a cross-section side view of the at least one cooling hole 120 taken along line III-III of FIG. 2. The outer wall 118 extends between an outer surface 126 and an interior surface 128. At least one cooling passage 130 extends between an inlet 132 and an outlet 134. The inlet 132 is fluidly coupled to the at least one cooling supply conduit 124 at the interior surface 128. The outlet 134 opens onto the outer surface 126 located along the leading edge 114. The at least one cooling hole 120 is illustrated as multiple cooling holes 120a, 120b, 120c each having cooling passages 130. A curvilinear centerline (CL) extends between the inlet 132 and the outlet 134 to define a curved passage 136 having at least one turn 138. By way of non-limiting example the curvilinear centerline (CL) extends between a geometric center ($GC_i$) of the inlet 132 and a geometric center ($GC_o$) of the outlet 134. The curvilinear centerline (CL) can extend first in the chord-wise direction 117 or in a more general axial direction with respect to the engine centerline 12 and then through the turn 138 extending in the span-wise direction 97 or in a more general radial direction with respect to the engine centerline 12.

A first cross-sectional area ($Ca_1$) of the curved passage 136 at the outlet 134 defines a first height ($H_1$) oriented within between +/−45 degrees, α, of the chord-wise direction 117. The first height ($H_1$) can be oriented perpendicular to the curvilinear centerline (CL) and measured from an upstream location of the outlet 134 with respect to the cooling fluid flow (C). The first height ($H_1$) can also be the minimum dimension of the first cross-sectional area ($Ca_1$) at the outlet 134. A second cross-sectional area ($CA_2$) of the curved passage 136 at the inlet 132 defines a second height ($H_2$) oriented within +/−30 degrees, β, of the span-wise direction 97. The second height ($H_2$) can be oriented parallel to the stagnation line (L) or the second height ($H_2$) can be the maximum dimension of the second cross-sectional area ($Ca_2$) at the inlet 132. The height of the curved passage 136 can continuously decrease such that the first height ($H_1$) is smaller than the second height ($H_2$). In some aspects the first height ($H_1$) falls in the range (0.2 $H_2 \geq H_1 \geq 0.5$ $H_2$). Even more narrowly the first height ($H_1$) can fall in the range (0.3 $H_2 \geq H_1 \geq 0.4$ $H_2$). The height narrowing enables a cooling fluid flow (C) received by the inlet 132 to converge in at least one direction as the cooling fluid flow (C) travels toward the outlet 134.

Figure 4:
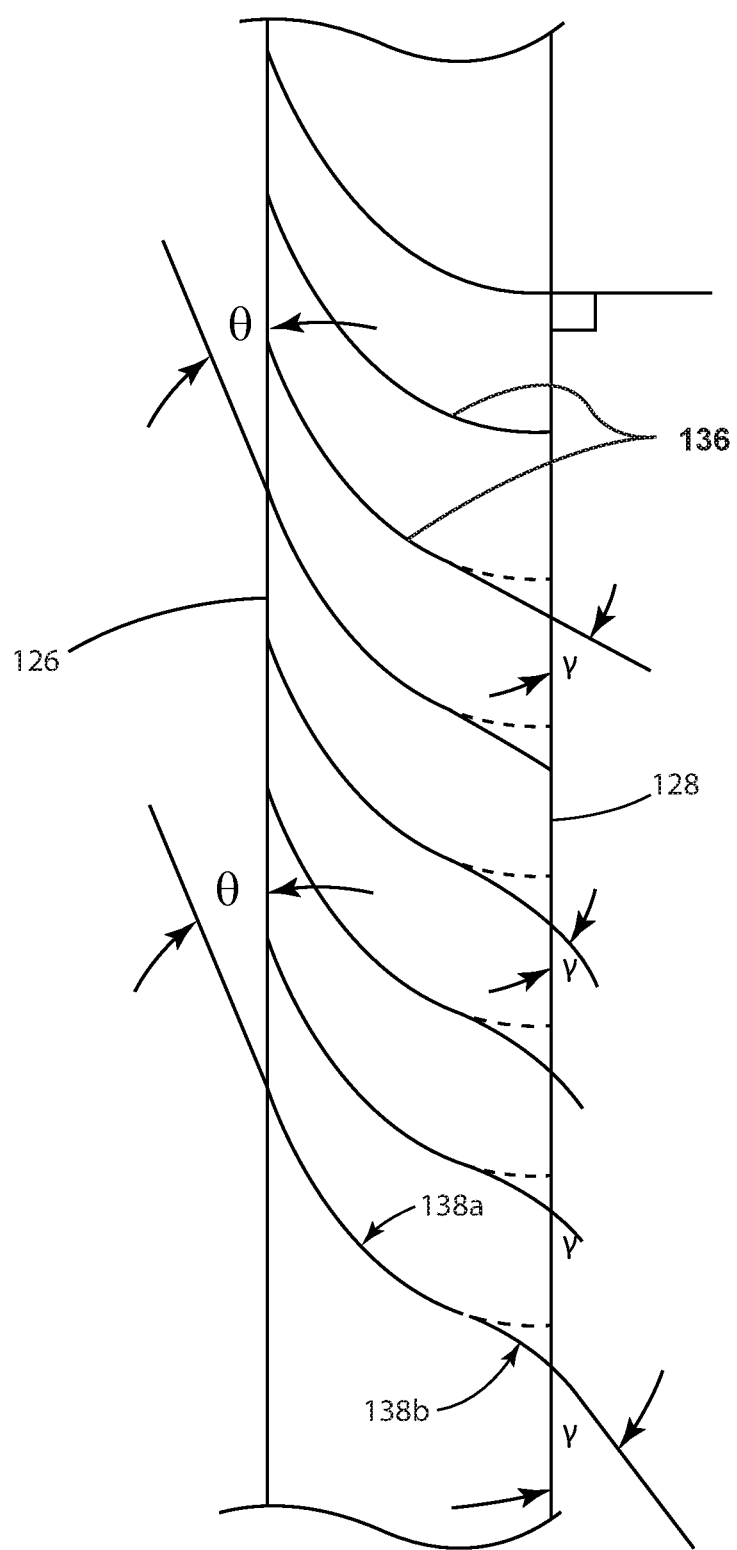
FIG. 4 is a schematic cross-section similar to FIG. 3 illustrating an arrangement of cooling passages along the leading edge of the turbine blade from FIG. 2.

Turning to FIG. 4, a schematic representation of an arrangement of curved passages 136 for the cooling holes 120 is illustrated. For illustrative purposes only the curvilinear centerline (CL) is illustrated. The curvilinear centerline (CL) of the curved passage 136 forms an approach angle θ with the outer surface 126 at the outlet 134. The approach angle θ can range between 10 and 45 degrees, and can be equal to the angle α. The curvilinear centerline (CL) of the curved passage 136 forms an approach angle γ with the interior surface 128 at the inlet 132. The approach angle γ can range between 0 and 90 degrees, when measuring the acute angle between the interior surface 128 and the curvilinear centerline (CL). In some aspects of the disclosure herein, when the approach angle γ is less than 70 degrees, the curved passage 136 can define multiple turns $138_a$, $138_b$ forming an s-shaped curved passage 136.

Figure 5:
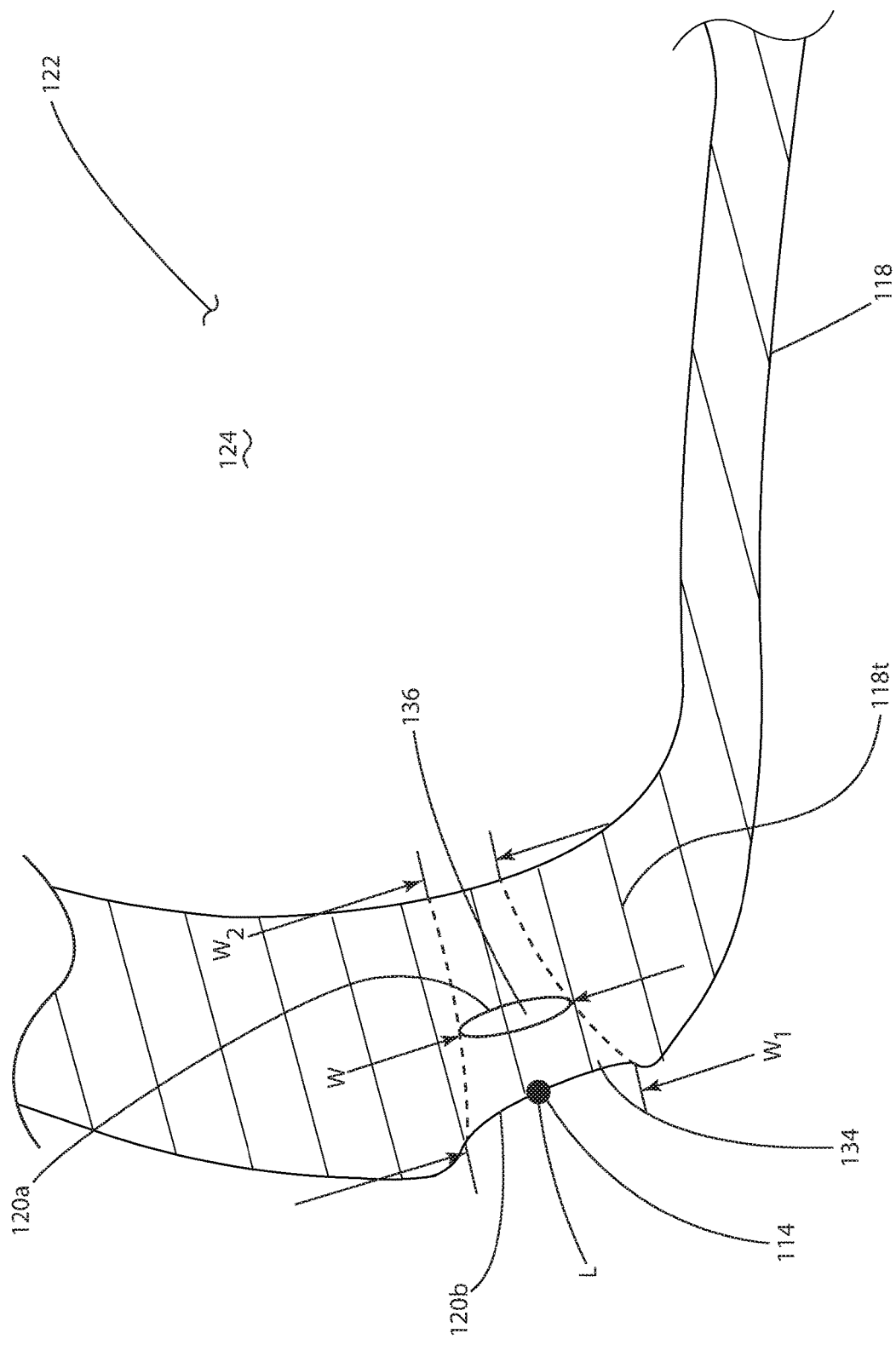
FIG. 5 is a cross-section of the turbine blade taken along line V-V of FIG. 3 illustrating the cooling passage.

FIG. 5 is a cross-section taken along V-V in FIG. 3 illustrating an entire leading edge portion of the airfoil 92. The interior 122 of the airfoil 92 is bound by outer wall 118 and includes multiple cooling supply conduits 124. Pin fins, dimples, turbulators, or any other type of flow enhancer can be provided along an interior surface of the multiple cooling supply conduits 124.

The multiple cooling holes 120 can be layered such that the curved passage 136 of cooling hole 120a is located within the outer wall 118 inward from the outlet 134 of cooling hole 120b. It can more clearly be seen that while the height of the curved passage 136 decreases, a width (W) can increase along the curvilinear centerline (CL). In this manner the first cross-sectional area ($CA_1$) is further defined by a first width ($W_1$) and the second cross-sectional area ($CA_2$) is further defined by a second width ($W_2$) such that the first width ($W_1$) is greater than the second width ($W_2$). As will be described in more detail below, the first and second widths ($W_1$, $W_2$) are measured within the same plane as the cross-sectional areas ($CA_1$, $CA_2$) and are perpendicular to the first and second heights ($H_1$, $H_2$). In one aspect, the widths are measured in a direction transverse to the span-wise direction 97. The increasing width (W) enables the cooling fluid flow (C) received by the inlet 132 to diverge in at least one direction as the cooling fluid flow (C) travels toward the outlet 134. More specifically the cooling fluid flow (C) diverges in a direction substantially perpendicular to the stagnation line (L). Substantially meaning within at least 5% of ninety degrees. The outer wall 118 along the leading edge 114 can be a thickened outer wall $118_T$ when compared to remaining portions of the outer wall. The thickened outer wall $118_T$ can accommodate the full extent of the curved passage 136.

Figure 6:
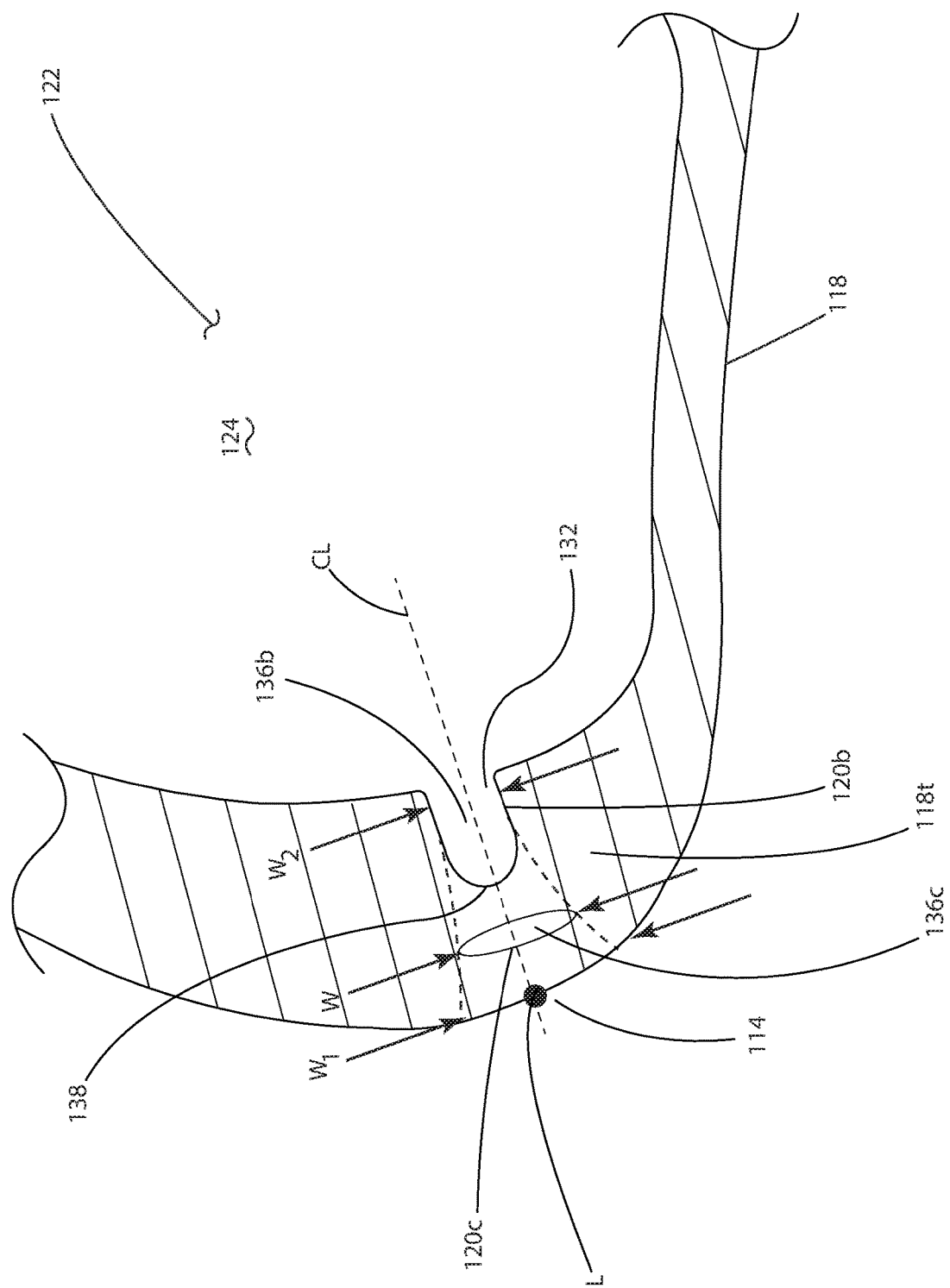
FIG. 6 is a cross-section of the turbine blade taken along line VI-VI of FIG. 3 illustrating the cooling passage.

FIG. 6 is a cross-section taken along VI-VI in FIG. 3 below the cross-section of FIG. 5. At this cross-section, it can more clearly be seen that the multiple cooling holes 120 are layered such that a portion of the curved passage 136b of cooling hole 120b is shown extending from the inlet 132 toward the leading edge 114 before turning out of the page at the turn 138. The curved passage 136c of cooling hole 120c can be located within the outer wall 118 between the curved passage 136b of cooling hole 120b and the leading edge 114 of the outer wall 118.

Figure 7:
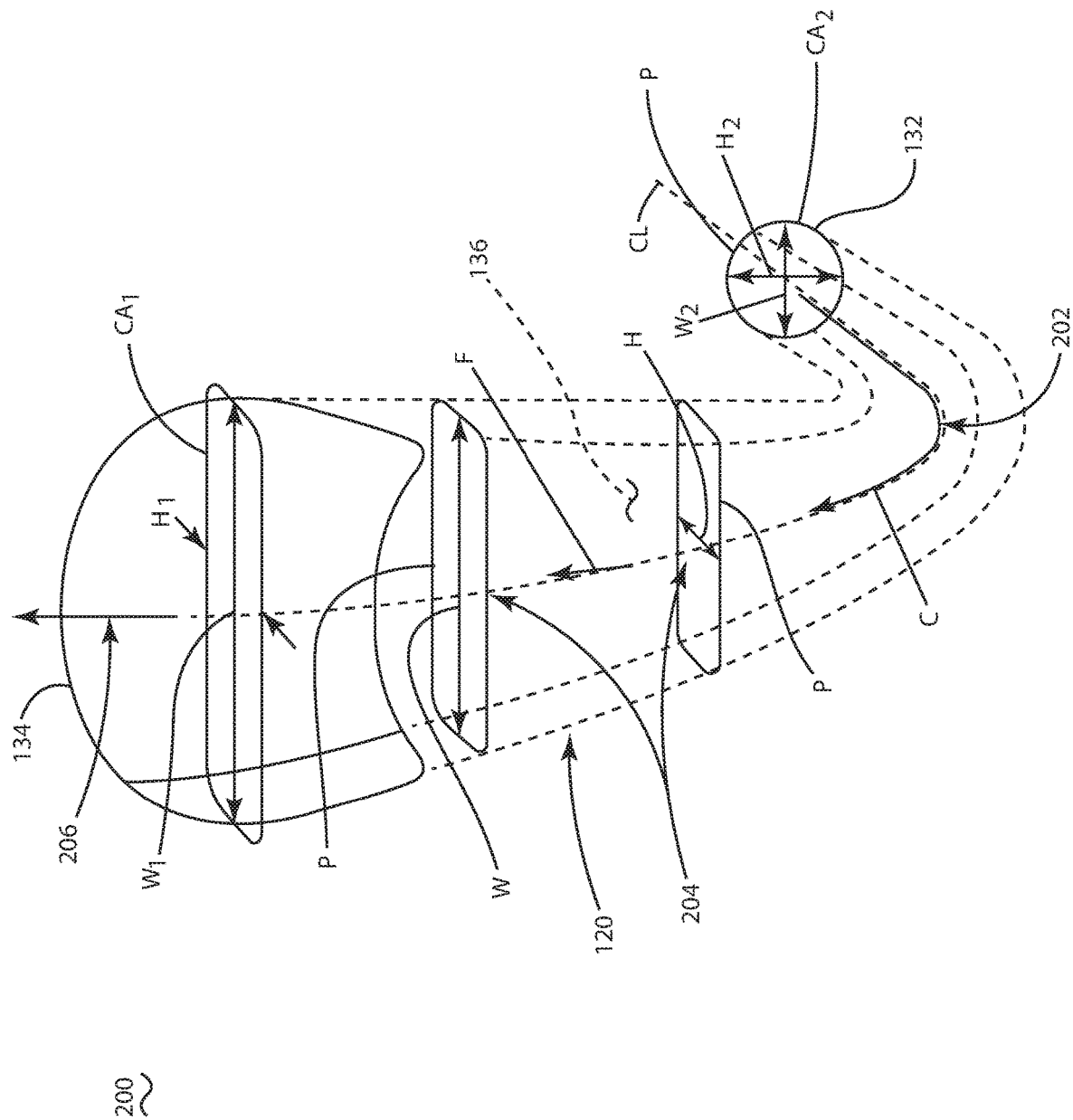
FIG. 7 is a 3D schematic illustration of the at least one cooling hole from FIG. 2.

FIG. 7 is a 3D image of the at least one cooling hole 120. It can more clearly be seen that the cross-sectional areas ($CA_1$, $CA_2$) as described herein can be defined along a plane (P) perpendicular to a flow direction (F) at any point of the curvilinear centerline (CL). The flow direction (F) can be defined as the resultant vector of the direction for the cooling fluid flow (C). A second aspect ratio ($W_2/H_2$) of the second cross-sectional area ($CA_2$) is less than a first aspect ratio ($W_1/H_1$) of the first cross-sectional area ($CA_1$). The first aspect ratio ($W_1/H_1$) is greater than 1:1 and defines a cross-sectional area ($CA_1$) that is a non-circular shape. The shape of the outlet 134 along the leading edge can be a diffusing shape with the plane (P) forming a rounded rectangular shape. While a cross-sectional area (CA2) at the inlet 132 can be circular or oval or any shape having an aspect ratio less than or equal to 1:1.

A method 200 of cooling the engine component as described herein includes at 202, flowing the cooling fluid flow (C) from the interior 122 through the curved passage 136 of the cooling hole 120 from the inlet 132 to the outlet 134 to define the flow direction (F). At 204 converging the cooling fluid flow in a first direction (H) and simultaneously diverging the cooling fluid flow in a second direction (W) perpendicular to the first direction where both the first and second directions lie in the plane (P). At 206 exhausting the cooling fluid flow (C) at a location proximate the stagnation line (L). The method can further include exhausting the cooling fluid flow (C) toward the tip 94.

Figure 8:
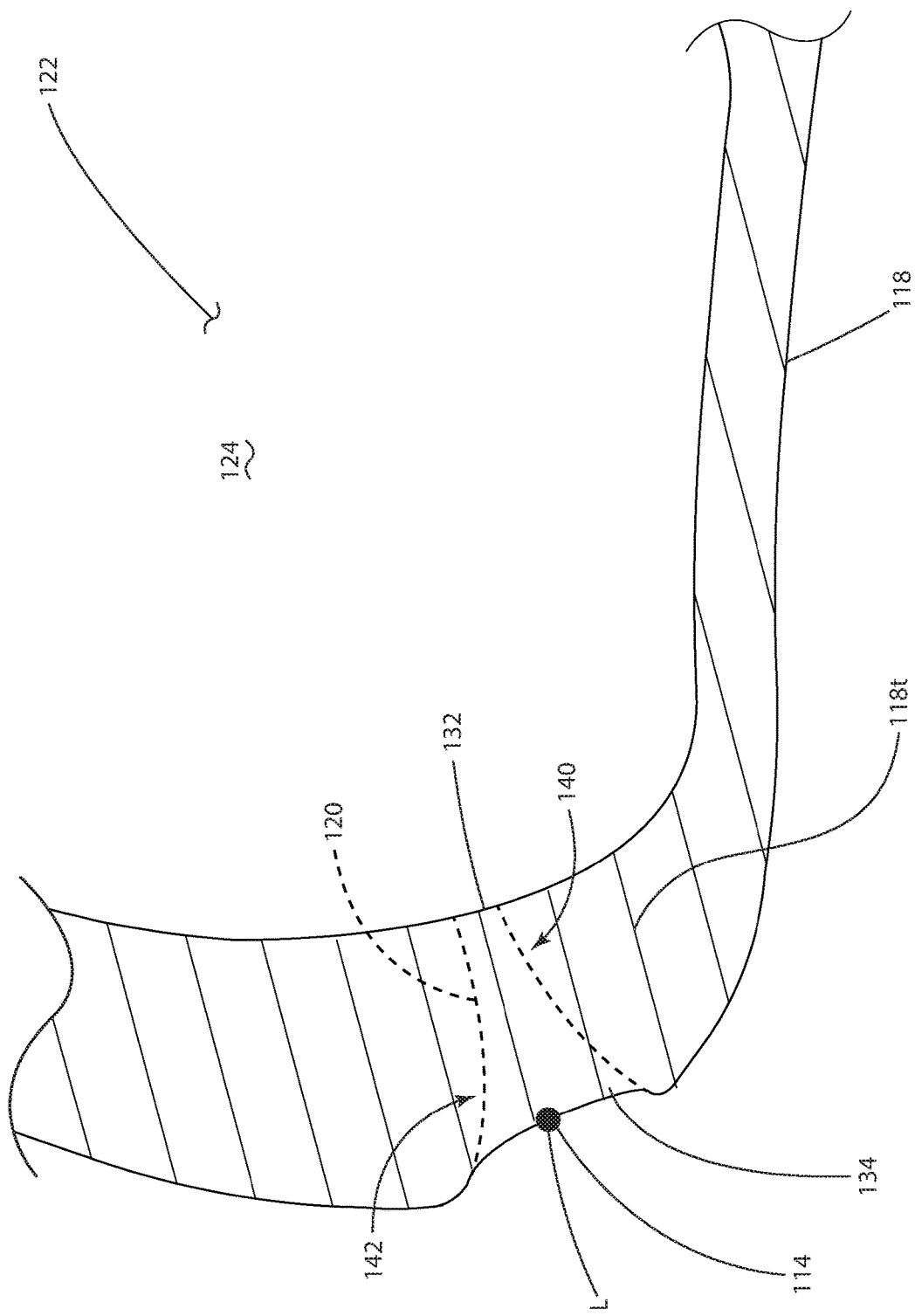
FIG. 8 is a variation of a cross-section of the turbine blade from FIG. 6 according to an aspect of the disclosure herein.

FIG. 8 is a variation of the cross-section taken along VI-VI illustrated in FIG. 6. In the illustrated variation, the cooling hole 120 includes a rapid expansion section 140 and a slow expansion section 142. In the illustrated variation, a continuous smooth transition occurs between the rapid expansion section 140 and the slow expansion section 142.

Figure 9:
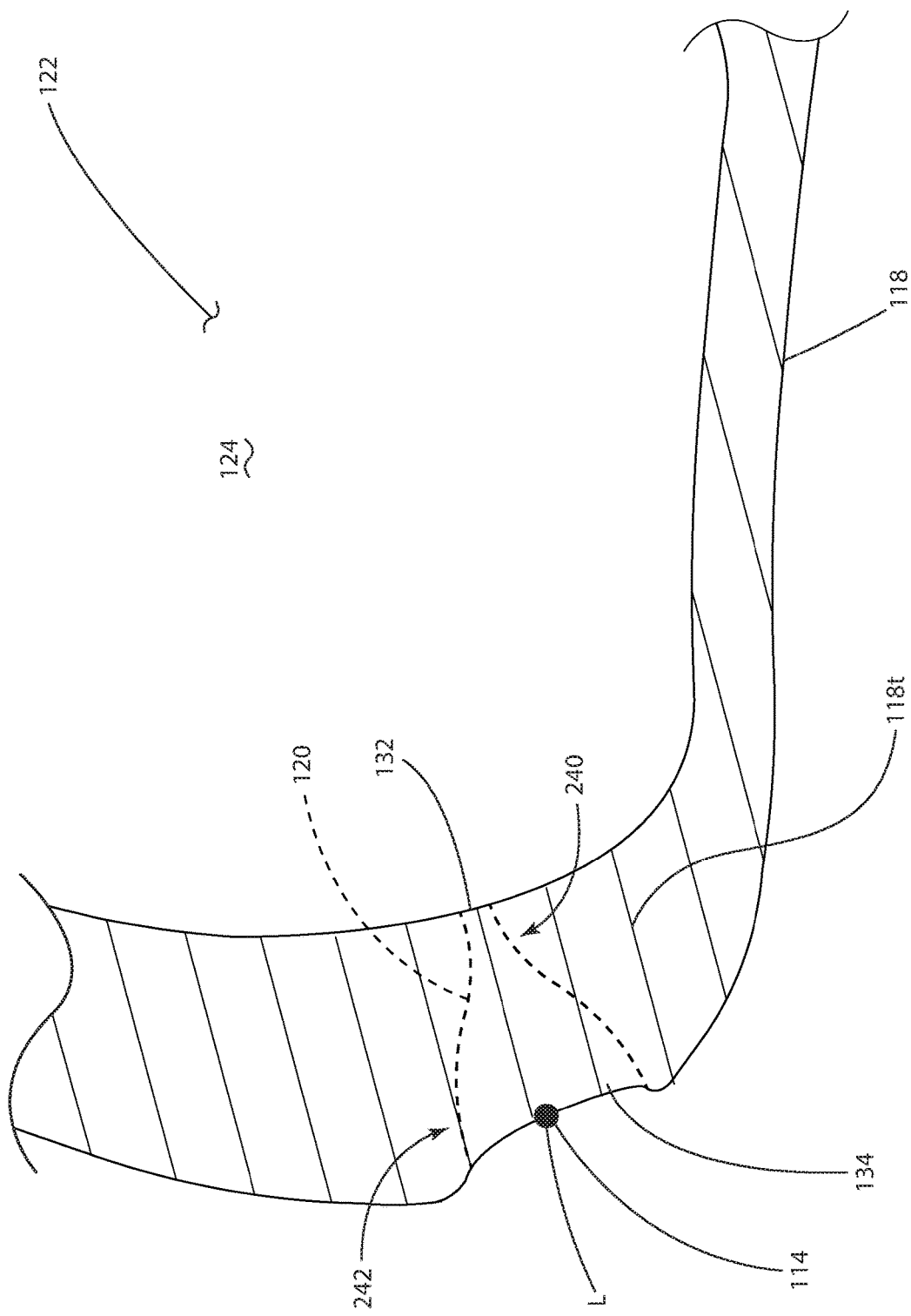
FIG. 9 is a variation of a cross-section of the turbine blade from FIG. 6 according to yet another aspect of the disclosure herein.

Turning to FIG. 9 a variation of the cross-section taken along VI-VI illustrated in FIG. 6 is illustrated. In this illustrated variation, the cooling hole 120 includes a rapid expansion section 240 and a slow expansion section 242. In the illustrated variation, a discontinuous transition occurs between the rapid expansion section 240 and the slow expansion section 242. Depending on the flow rate required through the cooling hole 120, different expansion sections 140, 142, 240, 242 can be formed with varying transitions, zero, continuous, or discontinuous. Continuous as used herein refers to a constant rate at which the transition takes place. Discontinuous as used herein refers to a changing rate at which the transition takes place, by way of non-limiting example in a step formation or with intermediate transitions connected each having continuous rates 240 themselves. Zero transition would be an area of constant cross-sectional area extending along the centerline.

Figure 10:
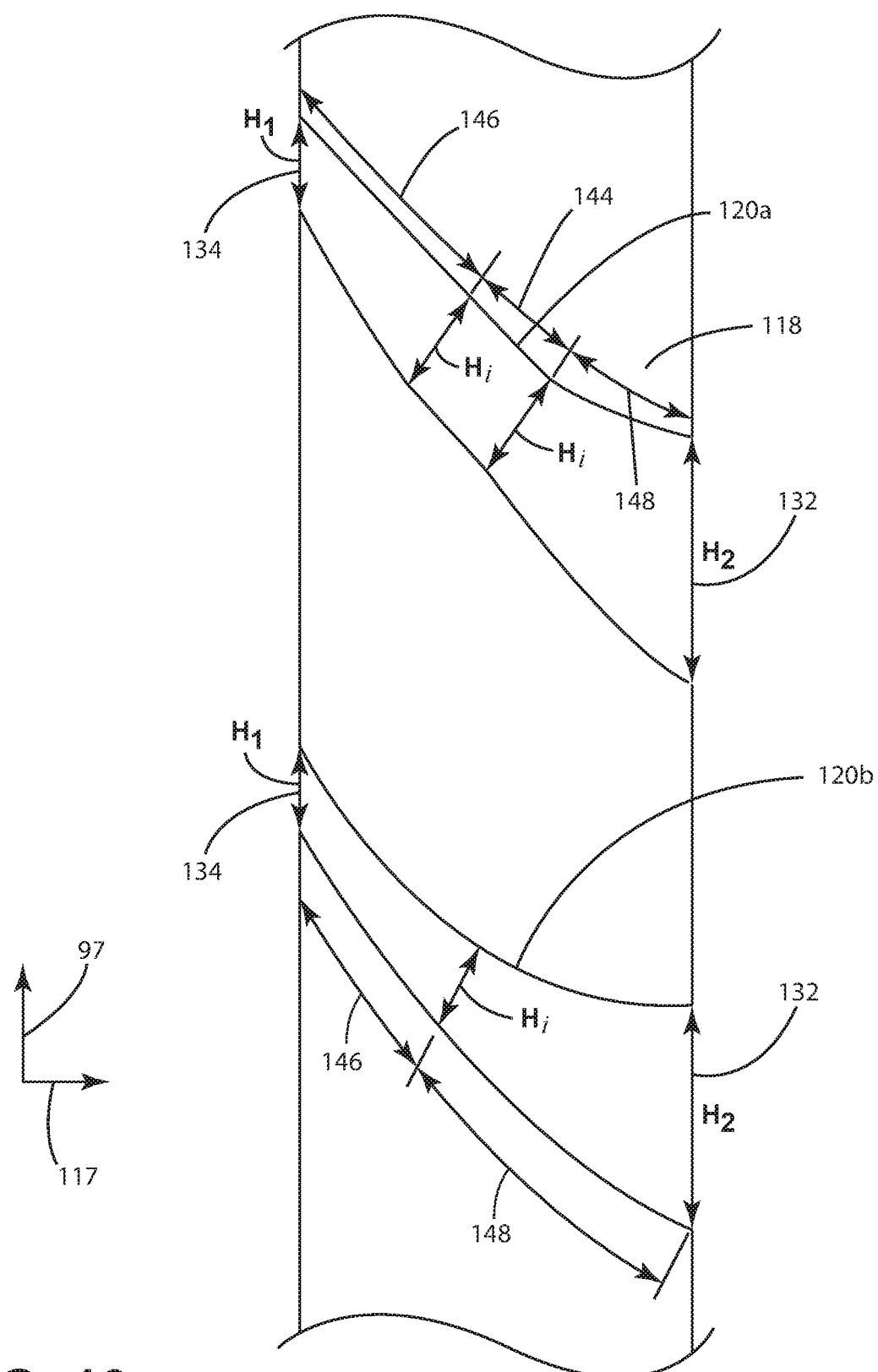
FIG. 10 is a variation of the cross-section of the turbine blade from FIG. 3 according to an aspect of the disclosure herein.

FIG. 10 is a variation of the cross-section taken along line illustrated in FIG. 3. Similarly to the varying transitions illustrated in FIGS. 8 and 9, the cooling hole 120 can include collapsing sections that vary in terms of the rate at which the cooling hole 120 closes between the first height ($H_1$) and the second height ($H_2$). In one aspect, the cooling hole 120a can include a constant section 144, where an intermediate height ($H_i$) remains constant. In another aspect, the cooling hole 120b can include a rapidly collapsing section 146 and a slowly collapsing section 148 where the intermediate height ($H_i$) occurs at a single location distinguishing the sections from each other. Depending on the flow rate required through the cooling hole 120, different collapsing sections 144, 146, 148 can be formed in varying combinations.

Figure 11:
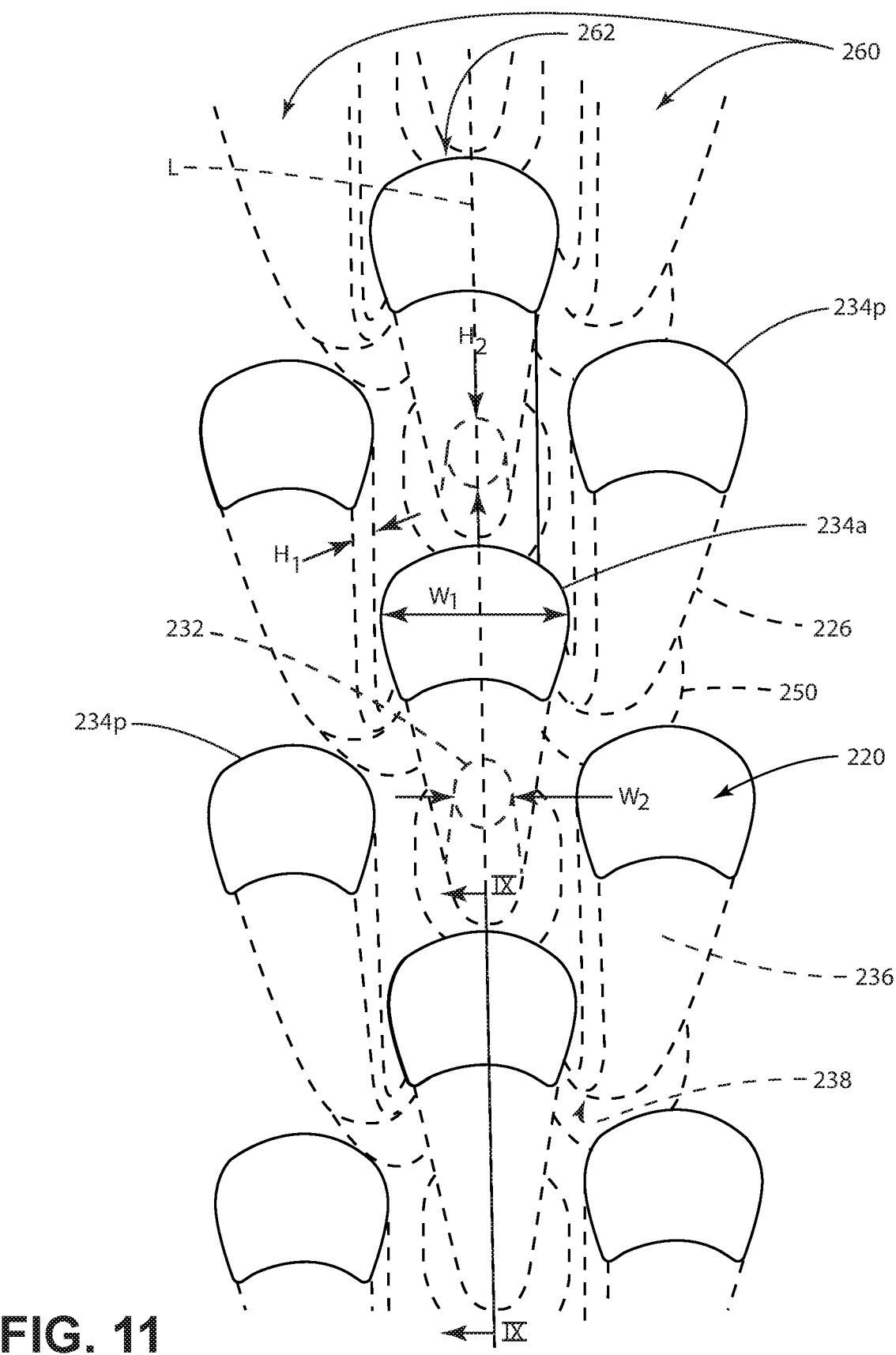
FIG. 11 is a front view of the leading edge including at least one cooling hole according to an aspect of the disclosure herein.

FIG. 11 is a front view of the leading edge 114 along the stagnation line (L) illustrating at least one cooling hole 220, shown as multiple cooling holes 220. The at least one cooling hole 220 is similar to the at least one cooling hole 120, therefore, like parts will be identified with like numerals increased by 100, with it being understood that the description of the like parts of the at least one cooling hole 120 applies to the at least one cooling hole 220, unless otherwise noted.

A pair of cooling hole rows 260 is arranged such that outlets $234_p$ of each cooling passage 230 of the pair of cooling hole rows 260 are located on either side of the stagnation line (L). A stagnation row 262 is arranged such that outlets $234_a$ associated with the cooling passage 230 of the cooling hole stagnation row 262 intersects the stagnation line (L). In an aspect of the disclosure herein, the stagnation row 262 can be staggered with respect to the pair of cooling hole rows 260 such that the outlets $234_p$, $234_a$ are unaligned. The method as described herein can further include exhausting the cooling fluid flow (C) through the row of outlets 234a of the stagnation row 262 along the stagnation line (L). 29. The method can also include exhausting the cooling fluid flow (C) through the pair of cooling hole rows 260 with outlets 234p bordering the stagnation line (L).

Again the height ($H_1$, $H_2$) and width ($W_1$, $W_2$) relationship can more clearly be seen in this front view. The first width ($W_1$) is greater than the second width ($W_2$) while the first height ($H_1$) is less than the second height ($H_2$). The outlets 234a, 234p can be diffusing outlets as illustrated to more effectively provide cooling film coverage to the leading edge 114 of the airfoil 92. A protrusion base 250 is illustrated in dotted line where a protrusion (FIG. 9) can extend into the interior 122 of the airfoil 92.

Figure 12:
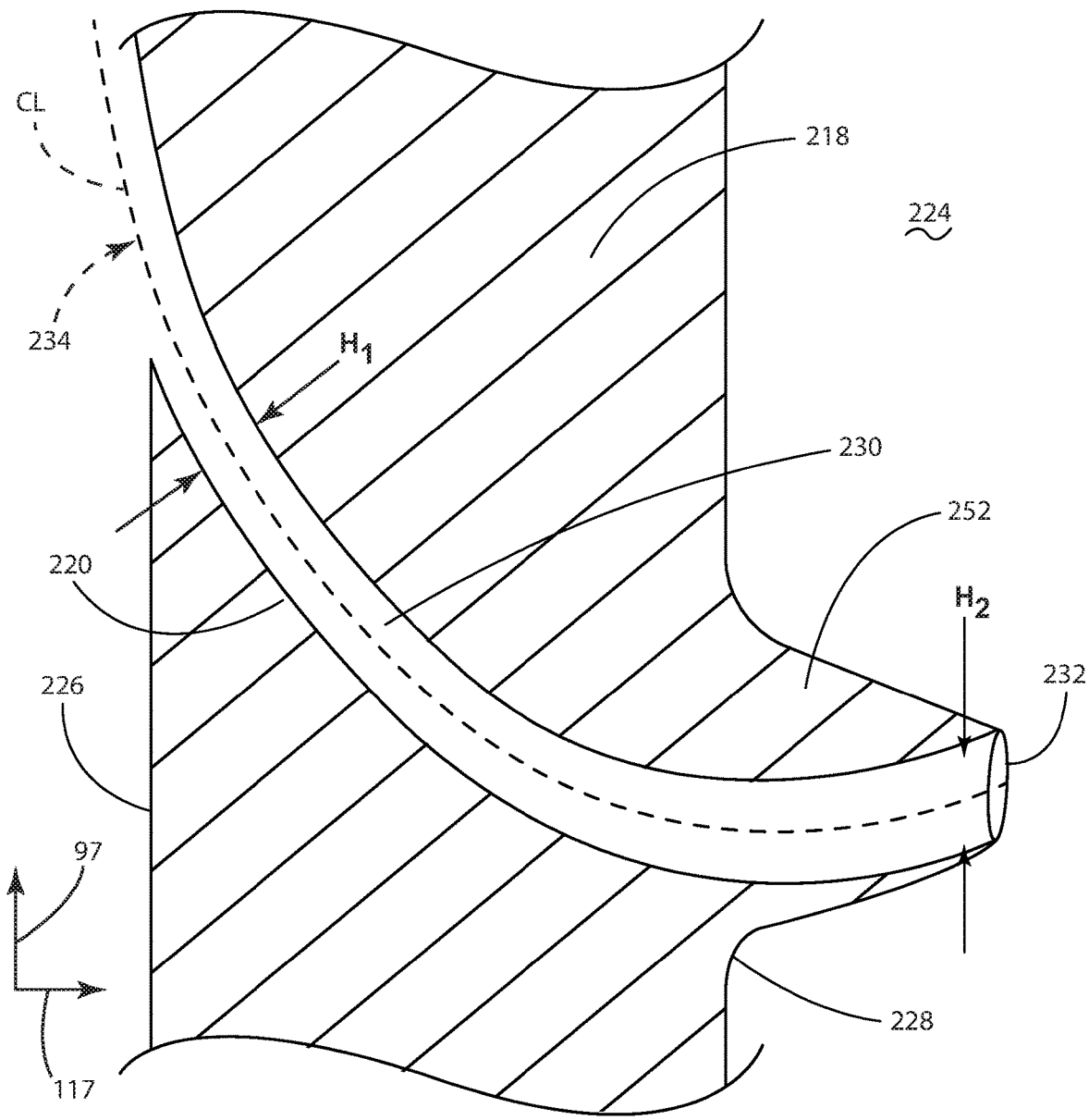
FIG. 12 is a cross-section of a portion of the turbine blade at the leading edge taken along line IX-IX of FIG. 11 illustrating a variation of the cooling passage according to another aspect of the disclosure herein.

FIG. 12 is a side view of the at least one cooling hole 220 taken along line IX-IX of FIG. 11. It can more clearly be seen that the at least one cooling passage 230 extends into a cooling supply conduit 224 by way of a protrusion 252 extending from the protrusion base 250 along an interior surface 228 of the airfoil 92. An inlet 232 of the at least one cooling passage 230 is formed in the protrusion 252. In an aspect of the disclosure herein, multiple protrusions 252 can be formed along the interior surface 228 to form pin fins, dimples, turbulators, or any other type of flow enhancer.

Figure 13:
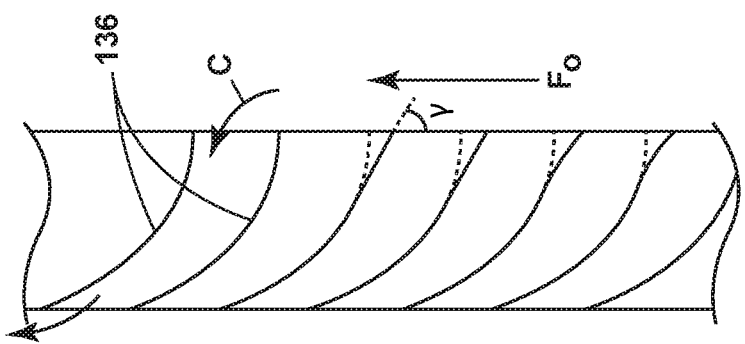
FIG. 13 is a variation of the schematic cross-section from FIG. 4 illustrating an arrangement of cooling passages along the leading edge of the turbine blade from FIG. 2 according to an aspect of the disclosure herein.

FIG. 13 is a schematic representation of an arrangement of curved passages 136 for the cooling holes 120 similar to those illustrated in FIG. 4 with an arrow illustrating a direction of flow ($F_i$, $F_o$) for the cooling fluid (C). The approach angle γ can change depending on the flow ($F_i$, $F_o$) direction. In this illustration the approach angle γ ranges from 90 degrees to an acute angle facing radially inward in order for the inlet 132 as described herein to face an outward radial flow direction ($F_o$). The cooling fluid flow (C) exits in an outward radial flow direction as well.

Figure 14:
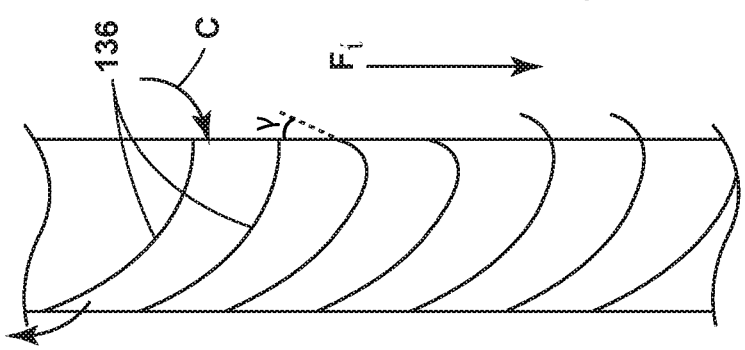
FIG. 14 is another variation of the schematic cross-section from FIG. 4 illustrating an arrangement of cooling passages along the leading edge of the turbine blade from FIG. 2 according to an aspect of the disclosure herein.

FIGS. 14-18 each illustrate different arrangements associated with the curved passages 136 depending on the direction of flow ($F_i$, $F_o$) for the cooling fluid (C). FIG. 14 illustrates the approach angle γ ranging from 90 degrees to an acute angle facing a radially outward direction in order for the inlet 132 as described herein to face an inward radial flow direction ($F_i$). The cooling fluid flow (C) turns 180 degrees in order to exit in an outward radial flow direction.

Figure 15:
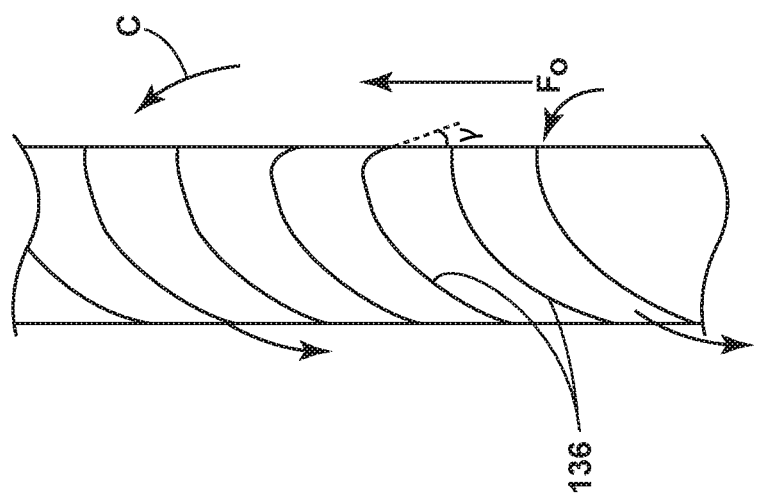
FIG. 15 is yet another variation of the schematic cross-section from FIG. 4 illustrating an arrangement of cooling passages along the leading edge of the turbine blade from FIG. 2 according to an aspect of the disclosure herein.

FIG. 15 illustrates the approach angle γ ranging from 90 degrees to an acute angle facing a radially inward direction in order for the inlet 132 as described herein to face an outward radial flow direction ($F_o$). The cooling fluid flow (C) turns 180 degrees in order to exit in an inward radial flow direction.

Figure 16:
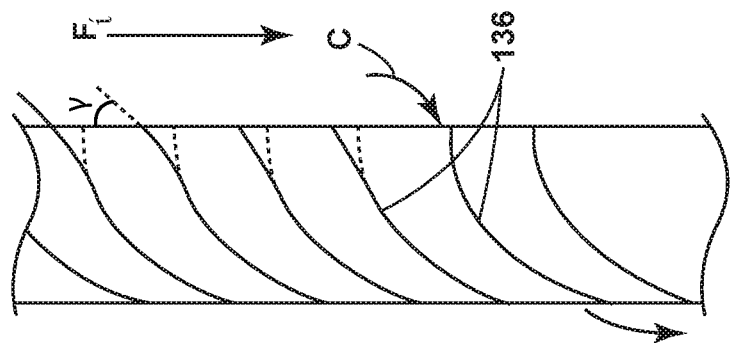
FIG. 16 is yet another variation of the schematic cross-section from FIG. 4 illustrating an arrangement of cooling passages along the leading edge of the turbine blade from FIG. 2 according to an aspect of the disclosure herein.

FIG. 16 illustrates the approach angle γ ranging from 90 degrees to an acute angle facing a radially outward direction in order for the inlet 132 as described herein to face an inward radial flow direction ($F_i$). The cooling fluid flow (C) exits in an inward radial flow direction as well.

Figure 17:
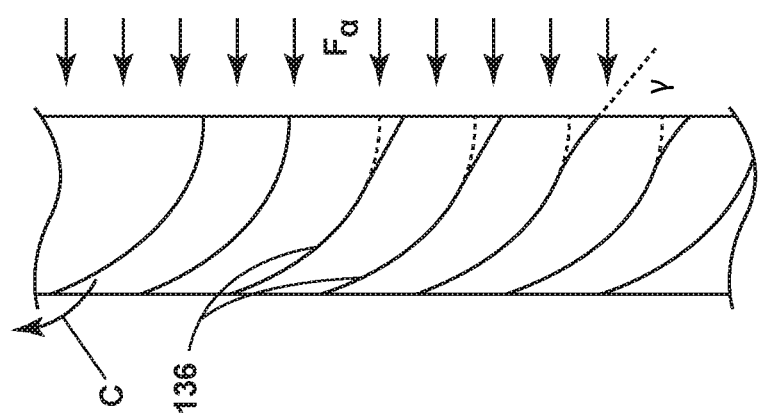
FIG. 17 is yet another variation of the schematic cross-section from FIG. 4 illustrating an arrangement of cooling passages along the leading edge of the turbine blade from FIG. 2 according to an aspect of the disclosure herein.

FIG. 17 illustrates the approach angle γ ranging from 90 degrees to an acute angle facing a radially inward direction in order for the inlet 132 as described herein to face an axial flow direction ($F_a$). The cooling fluid flow (C) is turned in the curved passages 136 to face an outward radial flow direction.

Figure 18:
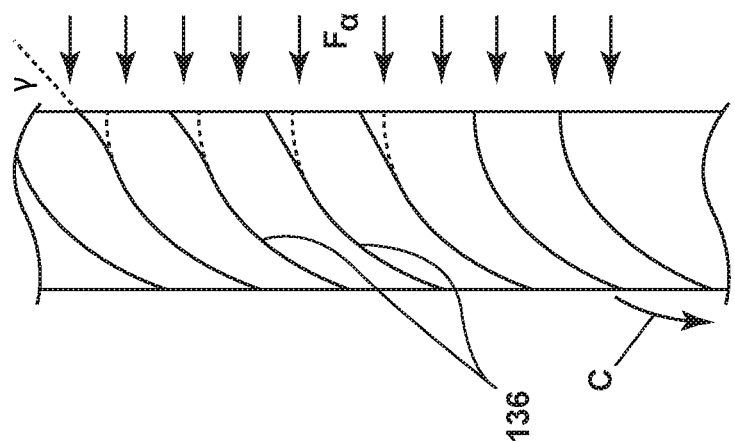
FIG. 18 is yet another variation of the schematic cross-section from FIG. 4 illustrating an arrangement of cooling passages along the leading edge of the turbine blade from FIG. 2 according to an aspect of the disclosure herein.

FIG. 18 illustrates the approach angle γ ranging from 90 degrees to an acute angle facing a radially outward direction in order for the inlet 132 as described herein to face an axial flow direction ($F_a$). The cooling fluid flow (C) is turned in the curved passages 136 to face an inward radial flow direction.

Figure 19:
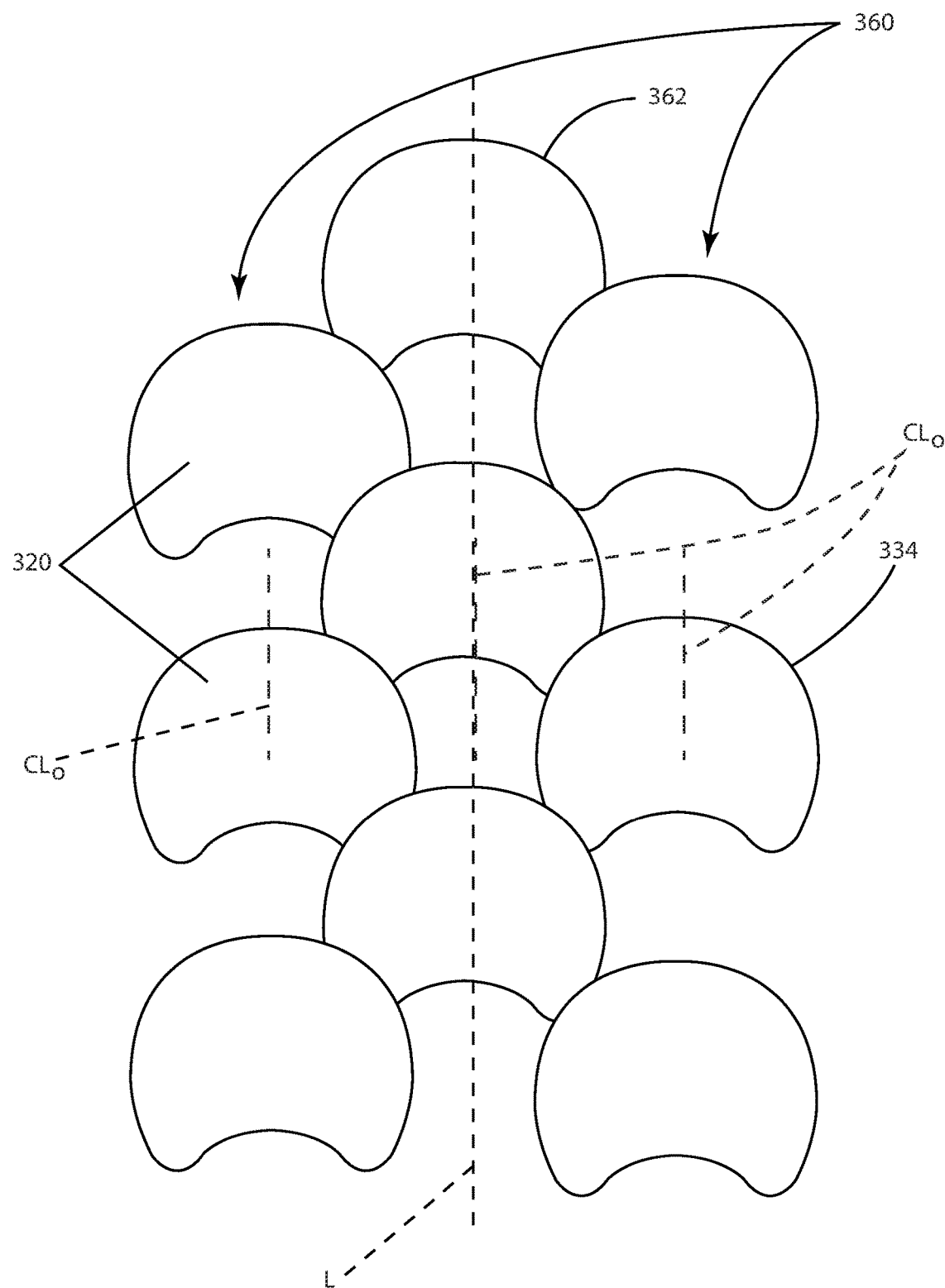
FIG. 19 is a front view of another variation of an arrangement of cooling holes along the leading edge of the turbine blade from FIG. 2 according to another aspect of the disclosure herein.

Turning to FIG. 19, an arrangement of cooling holes 320 according to another aspect of the disclosure herein is illustrated. The cooling holes 320 are similar to the at least one cooling hole 120, therefore, like parts will be identified with like numerals increased by 200, with it being understood that the description of the like parts of the at least one cooling hole 120 applies to the cooling holes 320, unless otherwise noted. It is contemplated outlets 334 associated with a pair of cooling hole rows 360 and a stagnation row 362 as described herein can overlap and have staggered intersecting footprints. The outlets 334 can each define an outlet centerline (CLo) that run substantially parallel to each other at the leading edge.

Figure 20:
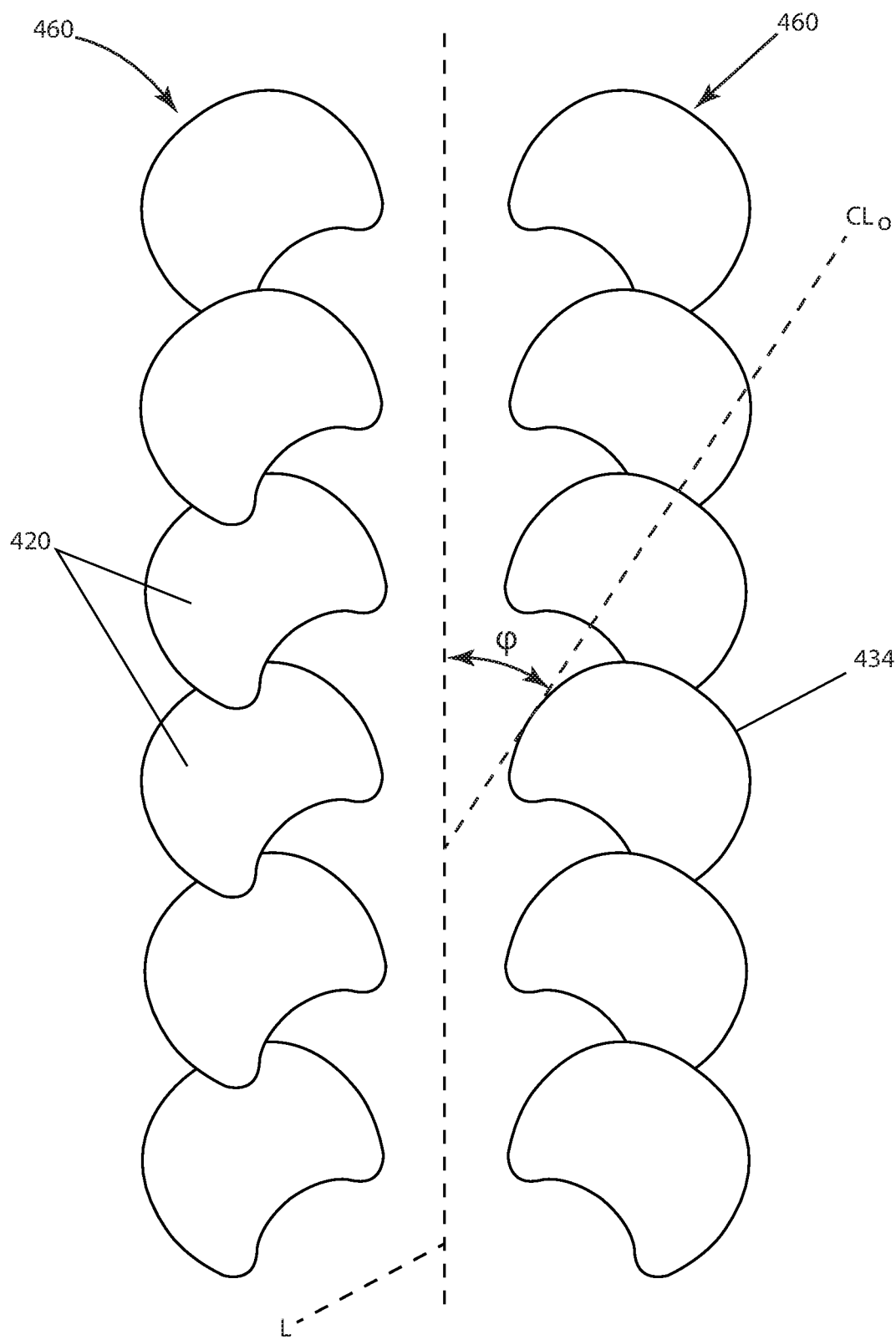
FIG. 20 is a front view of yet another variation of an arrangement of cooling holes along the leading edge of the turbine blade from FIG. 2 according to yet another aspect of the disclosure herein.

As illustrated in FIG. 20, an arrangement of cooling holes 420 according to another aspect of the disclosure herein is contemplated. The cooling holes 420 are similar to the at least one cooling hole 120, therefore, like parts will be identified with like numerals increased by 300, with it being understood that the description of the like parts of the at least one cooling hole 120 applies to the cooling holes 420, unless otherwise noted. A pair of cooling hole rows 460 is arranged such that an outlet centerline (CLo) of corresponding outlets 434 located on either side of the stagnation line (L) are angled ($\varphi$) with respect to the stagnation line (L). In this particular aspect, no cooling hole outlets intersect the stagnation line (L), but rather the pair of cooling hole rows 460 provide a border for the stagnation line (L). The method as described herein can further include exhausting the cooling fluid flow (C) through the pair of cooling hole rows 460.

It should be understood that any combination of the above described geometries with respect to the orientation and location of the cooling holes as described herein are also contemplated. By way of non-limiting example cooling holes could be staggered along the leading edge in alternating patterns where some cooling holes are oriented inversely of other cooling holes. The cooling holes as illustrated herein are for illustrative purposes only and not meant to be limiting.

Benefits associated with the at least one cooling hole as described herein are related to increased coverage of the leading edge and in particular the area surrounding the stagnation line as described herein. Angling the orientation of the outlets with respect to the stagnation line enable more spreading out of the cooling film and less penetration into any surrounding flow. Commercially better cooling coverage of the area surrounding the stagnation line increases the durability and the life of the engine component.

Benefits associated with overlapping footprints of the cooling holes as illustrated in FIG. 19 and FIG. 20, include that any potential gaps are minimized where hot air could contact the airfoil instead of cooling air. This improves durability of the material from which the airfoil is formed. In addition to coverage these arrangements help direct film cooling toward hotter regions of the airfoil, particularly in FIG. 20.

The sets of cooling holes as described herein can be manufactured utilizing additive manufacturing technologies or other advanced casting manufacturing technologies such as investment casting and 3-D printing and laser drilling and EDM drilling. The technologies available provide cost benefits along with the other benefits described. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turboprop engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects, and advantages of the present disclosure may also be embodied in the following technical solutions as defined by the clauses:

1. An airfoil for a turbine engine, the airfoil comprising: an outer wall having an outer surface and bounding an interior, the outer wall defining a pressure side and a suction side, extending axially between a leading edge and a trailing edge to define a chord-wise direction, extending radially between a root and a tip to define a span-wise direction, and defining a stagnation line extending in the span-wise direction separating the pressure side from the suction side proximate the leading edge; at least one cooling supply conduit provided in the interior; and at least one cooling passage fluidly coupling the at least one cooling supply conduit to the outer surface of the outer wall, the at least one cooling passage comprising: an outlet opening onto the outer surface proximate the leading edge and having a first width and a first height defining a first cross-sectional area with a first aspect ratio greater than or equal to 1:1, an inlet fluidly coupled to the at least one cooling supply conduit and having a second width and a second height defining a second cross-sectional area, and a curved passage defining a curvilinear centerline extending between a geometric center of both the outlet and the inlet where the curvilinear centerline is perpendicular to the first and second cross-sectional areas.

2. The airfoil of any preceding clause, wherein the curved passage includes a section of continuous transition extending between the first cross-sectional area and the second cross-sectional area with a constant transition rate.

3. The airfoil of any preceding clause, wherein the curved passage includes a section of discontinuous transition extending between the first cross-sectional area and the second cross-sectional area with a changing transition rate.

4. The airfoil of any preceding clause, wherein the curved passage includes a constant section with zero transition rate extending between the first cross-sectional area and the second cross-sectional area.

5. The airfoil of any preceding clause, wherein the second cross-sectional area has a second aspect ratio that is less than the first aspect ratio.

6. The airfoil of any preceding clause, wherein the curvilinear centerline extends in a first direction from the inlet toward the leading edge and then in a second direction toward the tip.

7. The airfoil of any preceding clause, wherein the curvilinear centerline forms an angle of less than 45 degrees with the outer surface at the outlet.

8. The airfoil of any preceding clause, wherein the curvilinear centerline forms an angle of between 10 and 40 degrees with the outer surface at the outlet.

9. The airfoil of any preceding clause, wherein the curved passage defines a turn between an axial direction and a radial direction.

10. The airfoil of any preceding clause, wherein the turn defines an angle between 90 and 150 degrees.

11. The airfoil of any preceding clause, wherein the inlet is located within a protuberance extending into the cooling supply conduit.

12. The airfoil of any preceding clause, wherein the outlet is a diffusing outlet.

13. The airfoil of any preceding clause, wherein a stagnation line separates the pressure side from the suction side.

14. The airfoil of any preceding clause, wherein the outlet intersects the stagnation line.

15. The airfoil of any preceding clause, further comprising a pair of cooling hole rows located on either side of the stagnation line and including multiple of the at least one cooling passage.

16. The airfoil of any preceding clause, wherein an outlet centerline of each outlet associated with the pair of cooling hole rows is angled with respect to the stagnation line.

17. The airfoil of any preceding clause, wherein a stagnation row comprising the at least one cooling passage includes an outlet that intersects the stagnation line.

18. The airfoil of any preceding clause, wherein an outlet centerline of each respective outlet of the pair of cooling hole rows and the stagnation row are substantially parallel to each other.

19. A component for an engine with rotating parts about an engine centerline, the component having an interior bounded by an outer wall having an outer surface with a stagnation line defined by where a flow of combusted gases in contact with the outer surface has a velocity of zero, having at least one cooling supply conduit located within the interior, and having at least one cooling passage, the at least one cooling passage comprising: an outlet opening onto the outer surface proximate the stagnation line, the outlet having a first width and a first height defining a first cross-sectional area with a first aspect ratio greater than or equal to 1:1, an inlet fluidly coupled to the at least one cooling supply conduit and having a second width and a second height defining a second cross-sectional area, and a curved passage defining a curvilinear centerline extending between a geometric center of both the outlet and the inlet where the curvilinear centerline is perpendicular to the first and second cross-sectional areas; wherein the curved passage defines a turn between an axial direction and a radial direction with respect to the engine centerline.

20. The component of any preceding clause, wherein the first cross-sectional area is further defined by a first width and the second cross-sectional area is further defined by a second width, and the first width is greater than the second width.

21. The component of any preceding clause, wherein the outer surface further comprises a stagnation line separating two airflows along two sides of the component.

22. The component of any preceding clause, wherein the outlet intersects the stagnation line.

23. The component of any preceding clause, wherein the cooling passage is a pair of cooling passages having a pair of outlets that are located on each side of the stagnation line.

24. The component of any preceding clause, wherein the curvilinear centerline of each of the pair of cooling passages at their respective outlets is angled with respect to the stagnation line.

25. The component of any preceding clause, wherein an additional cooling passage comprises an outlet that intersects the stagnation line.

26. The component of any preceding clause, wherein the curvilinear centerline of each of the pair of cooling passages and the additional cooling passage at their respective outlets are substantially parallel to each other.

27. A method of cooling an engine component having an outer wall bounding an interior the method comprising: flowing a cooling fluid flow from the interior in a first direction through a curved passage of a cooling hole from an inlet to an outlet to define a flow direction; converging the cooling fluid flow in a first direction and simultaneously diverging the cooling fluid flow in a second direction perpendicular to the first direction where both the first and second directions lie in a plane perpendicular to the flow direction; and exhausting the cooling fluid flow at a location proximate a stagnation line of the engine component.

28. The method of any preceding clause, wherein exhausting the cooling fluid flow comprises exhausting the cooling fluid flow in the same direction as the first direction.

29. The method of any preceding clause, wherein exhausting the cooling fluid flow comprises exhausting the cooling fluid flow in an opposite direction as the first direction.

30. The method of any preceding clause, wherein exhausting the cooling fluid flow comprises exhausting the cooling fluid flow through a row of outlets along the stagnation line.

31. The method of any preceding clause, wherein exhausting the cooling fluid flow comprises exhausting the cooling fluid flow through a pair of rows of outlets bordering the stagnation line.

32. The method of any preceding clause, wherein exhausting the cooling fluid flow comprises exhausting the cooling fluid flow through a pair of rows of outlets bordering the stagnation line with each outlet having an outlet centerline angled away from the stagnation line.

What is claimed is:

1. An airfoil for a turbine engine, the airfoil comprising:
   an outer wall having an outer surface and bounding an interior, the outer wall defining a pressure side and a suction side, extending axially between a leading edge and a trailing edge to define a chord-wise direction, extending radially between a root and a tip to define a span-wise direction, and defining a stagnation line extending in the span-wise direction separating the pressure side from the suction side proximate the leading edge;
   at least one cooling supply conduit provided in the interior; and
   at least one cooling passage fluidly coupling the at least one cooling supply conduit to the outer surface of the outer wall, the at least one cooling passage comprising:
   an outlet opening onto the outer surface proximate the leading edge and having a first width and a first height defining a first cross-sectional area with a first aspect ratio greater than or equal to 1:1,
   an inlet fluidly coupled to the at least one cooling supply conduit and having a second width and a second height greater than the first height and defining a second cross-sectional area, and
   a curved passage defining a curvilinear centerline extending between a geometric center of both the outlet and the inlet.

2. The airfoil of claim 1, wherein the curved passage includes a section of continuous transition extending between the first cross-sectional area and the second cross-sectional area with a constant transition rate.

3. The airfoil of claim 1, wherein the curved passage includes a section of discontinuous transition extending between the first cross-sectional area and the second cross-sectional area with a changing transition rate.

4. The airfoil of claim 1, wherein the curved passage includes a constant section with zero transition rate extending between the first cross-sectional area and the second cross-sectional area.

5. The airfoil of claim 1, wherein the second cross-sectional area has a second aspect ratio that is less than the first aspect ratio.

6. The airfoil of claim 1, wherein the curvilinear centerline extends in a first direction from the inlet toward the leading edge and then in a second direction toward the tip.

7. The airfoil of claim 6, wherein the curvilinear centerline forms an angle of less than 45 degrees with the outer surface at the outlet.

8. The airfoil of claim 7, wherein the curvilinear centerline forms an angle of between 10 and 40 degrees with the outer surface at the outlet.

9. The airfoil of claim 1, wherein the curved passage defines a turn between an axial direction and a radial direction.

10. The airfoil of claim 9, wherein the turn defines an angle between 90 and 150 degrees.

11. The airfoil of claim 1, wherein the inlet is located within a protuberance extending into the cooling supply conduit.

12. The airfoil of claim 1, wherein the outlet is a diffusing outlet.

13. The airfoil of claim 1, wherein a stagnation line separates the pressure side from the suction side.

14. The airfoil of claim 13, wherein the outlet intersects the stagnation line.

15. The airfoil of claim 13, further comprising a pair of cooling hole rows located on either side of the stagnation line and including multiple of the at least one cooling passage.

16. The airfoil of claim 15, wherein an outlet centerline of each outlet associated with the pair of cooling hole rows is angled with respect to the stagnation line.

17. The airfoil of claim 15, wherein a stagnation row comprising the at least one cooling passage includes an outlet that intersects the stagnation line.

18. The airfoil of claim 17, wherein an outlet centerline of each respective outlet of the pair of cooling hole rows and the stagnation row are parallel to each other.

19. A component for an engine with rotating parts about an engine centerline, the component having an interior bounded by an outer wall having an outer surface with a stagnation line defined by where a flow of combusted gases in contact with the outer surface has a velocity of zero, having at least one cooling supply conduit located within the interior, and having at least one cooling passage, the at least one cooling passage comprising:
an outlet opening onto the outer surface proximate the stagnation line, the outlet having a first width and a first height defining a first cross-sectional area with a first aspect ratio greater than or equal to 1:1,
an inlet fluidly coupled to the at least one cooling supply conduit and having a second width and a second height greater than the first height and defining a second cross-sectional area, and
a curved passage defining a curvilinear centerline extending between a geometric center of both the outlet and the inlet;
wherein the curved passage defines a turn between an axial direction and a radial direction with respect to the engine centerline.

20. The component of claim 19, wherein the first cross-sectional area is further defined by a first width and the second cross-sectional area is further defined by a second width, and the first width is greater than the second width.

21. The component of claim 19, wherein the outer surface further comprises a stagnation line separating two airflows along two sides of the component.

22. The component of claim 21, wherein the outlet intersects the stagnation line.

23. The component of claim 22, wherein the cooling passage is a pair of cooling passages having a pair of outlets that are located on each side of the stagnation line.

24. The component of claim 23, wherein the curvilinear centerline of each of the pair of cooling passages at their respective outlets is angled with respect to the stagnation line.

25. The component of claim 24, wherein an additional cooling passage comprises an outlet that intersects the stagnation line.

26. The component of claim 25, wherein the curvilinear centerline of each of the pair of cooling passages and the additional cooling passage at their respective outlets are parallel to each other.

27. The component of claim 19 wherein the first width is greater than the second width.

28. An airfoil for a turbine engine, the airfoil comprising:
an outer wall having an outer surface and bounding an interior, the outer wall defining a pressure side and a suction side, extending between a leading edge and a trailing edge to define a chord-wise direction, extending between a root and a tip to define a span-wise direction, and defining a stagnation line extending in the span-wise direction separating the pressure side from the suction side proximate the leading edge;
at least one cooling supply conduit provided in the interior and defining an interior surface; and
at least one cooling passage fluidly coupling the at least one cooling supply conduit to the outer surface of the outer wall, the at least one cooling passage comprising:
an outlet opening onto the outer surface proximate the leading edge and having a first width and a first height defining a first cross-sectional area with a first aspect ratio greater than or equal to 1:1,
an inlet fluidly coupled to the at least one cooling supply conduit at the interior surface and having a second width and a second height greater than the first height and defining a second cross-sectional area, and
a curved passage defining a curvilinear centerline extending between a geometric center of both the outlet and the inlet and comprising multiple turns;
wherein the curvilinear centerline forms a first angle with the interior surface that is between 0 and 90 degrees.

29. The airfoil of claim 28 wherein a first angle is less than 70 degrees.

30. The airfoil of claim 29 wherein the curvilinear centerline forms a second angle with the outer surface that is between 10 and 45 degrees.

31. The airfoil of claim 28 wherein the curved passage is an s-shaped curved passage viewed along the chord-wise direction.

32. The airfoil of claim 28 wherein the at least one cooling passage is multiple cooling passages.

* * * * *